(12) United States Patent
Ando et al.

(10) Patent No.: US 6,289,359 B1
(45) Date of Patent: Sep. 11, 2001

(54) FILE MANAGING METHOD

(75) Inventors: Takaaki Ando; Mitsunori Kori; Manabu Michishita; Takayuki Hayakawa; Keiji Yoshimura, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/188,307

(22) Filed: Nov. 10, 1998

(30) Foreign Application Priority Data

Nov. 20, 1997 (JP) .................................................. 9-319527

(51) Int. Cl.[7] .................................................. G06F 17/30
(52) U.S. Cl. .............................. 707/205; 707/1; 707/104
(58) Field of Search .................................. 707/205, 101, 707/102, 1, 104

(56) References Cited

U.S. PATENT DOCUMENTS

| 5,247,665 | * | 9/1993 | Matsuda et al. | 707/101 |
|---|---|---|---|---|
| 5,327,341 | * | 7/1994 | Whalen et al. | 705/3 |
| 5,577,242 | * | 11/1996 | Yamaguchi et al. | 707/205 |
| 5,628,007 | * | 5/1997 | Nevarez | 707/102 |
| 5,991,753 | * | 11/1999 | Wilde | 707/2 |

FOREIGN PATENT DOCUMENTS 6176074   6/1994   (JP) .

OTHER PUBLICATIONS

"Sybase IQ", Jun. 17, 1998.
"Oracle 7 Server Distributed Systems vol. II: Replicated Data", Jun. 20, 1998.

* cited by examiner

Primary Examiner—Jack Choules
Assistant Examiner—Cheryl Lewis

(57) ABSTRACT

A file managing method includes subdividing an original file including records, each record including fields, for storing blocks, each block including fields subdivided from more than one of the records; coupling the blocks to into groups of blocks; rearranging the groups of blocks, and, after rearranging the groups of blocks, coupling the groups of blocks to each other to produce a transposed file; and accessing the fields from the transposed file, at random.

15 Claims, 19 Drawing Sheets

RECORD LENGTH = 256B
BLOCK SIZE = 64KB

RECORD LENGTH = 2048B
BLOCK SIZE = 64KB

RECORD LENGTH = 2048B
BLOCK SIZE = 8KB

FILE MANAGING METHOD

BACKGROUND OF THE INVENTION

1. Field of the Invention

The present invention is related to an improvement of a file managing method for a data file, which is directed to a process operation so that only necessary data is effectively derived from a large amount of saved data such as a database.

2. Description of the Related Art

Generally speaking, within a disk apparatus, data are grouped in units of a record, these data are arranged in accordance with a sequential order of the respective records, and the data are arranged in accordance with a definition order of fields within each of the records.

In FIG. 24, there is shown one example of the conventional file managing method in the file management. This drawing illustratively shows such a storage condition that records of a data file to be stored, which are defined from an i-th record up to "n" records have been stored in the disk apparatus.

Japanese Unexamined Patent Application No. Hei 6-176074, laid open in 1994 describes the technical aspect of the related database process operation. In this database process operation, after all of the data are once entered from the disk apparatus into the input/output buffer employed in the database calculating process apparatus, only necessary data are acquired into the internal memory by way of the selecting process operation and the projecting process operation. This technique is intended to effectively utilize the internal memory. However, no detailed explanation is given of the data definition by executing the selecting process operation and the projecting process operation. Also, no description is given of the method for utilizing the data acquired in the internal memory.

In such an above-described storage format in which the data are grouped in the units of the record and the grouped data are stored, even when only a partial field contained in the record is required, all of the records are inputted from the disk apparatus to the input/output buffer, and thereafter a process operation for separating only the necessary records is required.

A process operation for deriving only a partial field corresponds to such a process operation for deriving, for instance, only a name and an address from a staff member database constituted by numbers of staff members, names, ages, addresses, and telephone numbers. As shown in FIG. 25, while a field 17 corresponds to the names and another field 18 corresponds to the addresses, even when only two fields are required, since the data are not stored in the disk apparatus in such a manner that these data are subdivided by every field, all of the fields must be read out from the disk apparatus as to all of the records. Then, the process operation for separating the field 17 and the field 18 must be carried out.

Since the conventional file managing method is arranged in the above-described manner, even when only a partial field contained in the records is needed, all of the records must be entered from the disk apparatus into the input/output buffer. There is a problem. That is, even when the file is formed by separating only the necessary field, since the necessary fields are different, depending upon the use of the file, a process operation for separating only the necessary field must be carried out every time the file is used.

SUMMARY OF THE INVENTION

The present invention has been made to solve the above-described problem, and therefore, has an object of providing a file managing method. That is, since only a portion containing a field required in a process operation is read out from a disk apparatus and an amount of data read from the disk apparatus is reduced, the time required to read the data from the disk apparatus is shortened and thus the high speed operation can be realized.

A file managing method, according to the present invention, is featured by that a preselected number of records are subdivided from an original file for storing thereinto a plurality of records constituted by a plurality of fields so as to set the subdivided fields as blocks; all of these subdivided blocks are coupled to each other so as to rearrange these subdivided blocks as a group; as to all of the plural records, the respective subdivided blocks thereof are rearranged as the groups, and thereafter these rearranged groups are coupled to each other so as to produce a transposed file; and the fields are accessed at random from the transposed file.

Also, the file managing method is featured by that each of the fields of the record is changed into either one or a plurality of fields having fixed lengths every field; and after all of the records are changed into fields having fixed lengths, the fixed-length-fields are subdivided from the original file so as to set the subdivided fields as blocks.

Further, the file managing method is featured by that either one or plural fields of the record, which are located adjacent to each other, are combined with each other to be changed into a field having a fixed length.

Also, the file managing method is featured by that after the fields are sequentially formed by a fixed value from a head position of the record to thereby form an entire area of the records as a field having a fixed length, the field having the fixed length is subdivided from the original file so as to form a block.

Further, the file managing method is featured by that the order of records within the block is changed every block.

Further, the file managing method is featured by that a record starting position within the block is changed every block, and the records within the block are arranged by way of a wrap around manner.

Also, the file managing method is featured by that the coupling sequence of the blocks within the group is changed every group.

Further, the file managing method is featured by that blocks which have high possibilities to be accessed simultaneously are arranged adjacent to each other.

Also, the file managing method is featured by that a preselected number of records selected from an original file for storing therein a plurality of records constituted by a plurality of fields are subdivided from the original file so as to set the subdivided fields as blocks; all of the subdivided blocks are coupled to each other to rearrange the subdivided blocks as groups; the groups are stored into a plurality of disk apparatuses every a preselected number of the groups; and the respective disk apparatuses are accessed in a parallel manner as to an access operation to the original file.

Further, the file managing method is featured by that either a maximum value or a minimum value of the field values of the records is acquired every the group to retrieve the records.

Also, the file managing method is featured by that an identifier indicative of either an entering order of the records or entering timing of the records is added to the record; and either a maximum value of the identifier or a minimum value of the identifier is acquired with respect to each of the groups to thereby retrieve the record.

DETAILED DESCRIPTION OF THE PREFERRED EMBODIMENTS

Now, a description will be given in more detail of preferred embodiments of the present invention with reference to the accompanying drawings.

(Embodiment 1)

Figure 1:
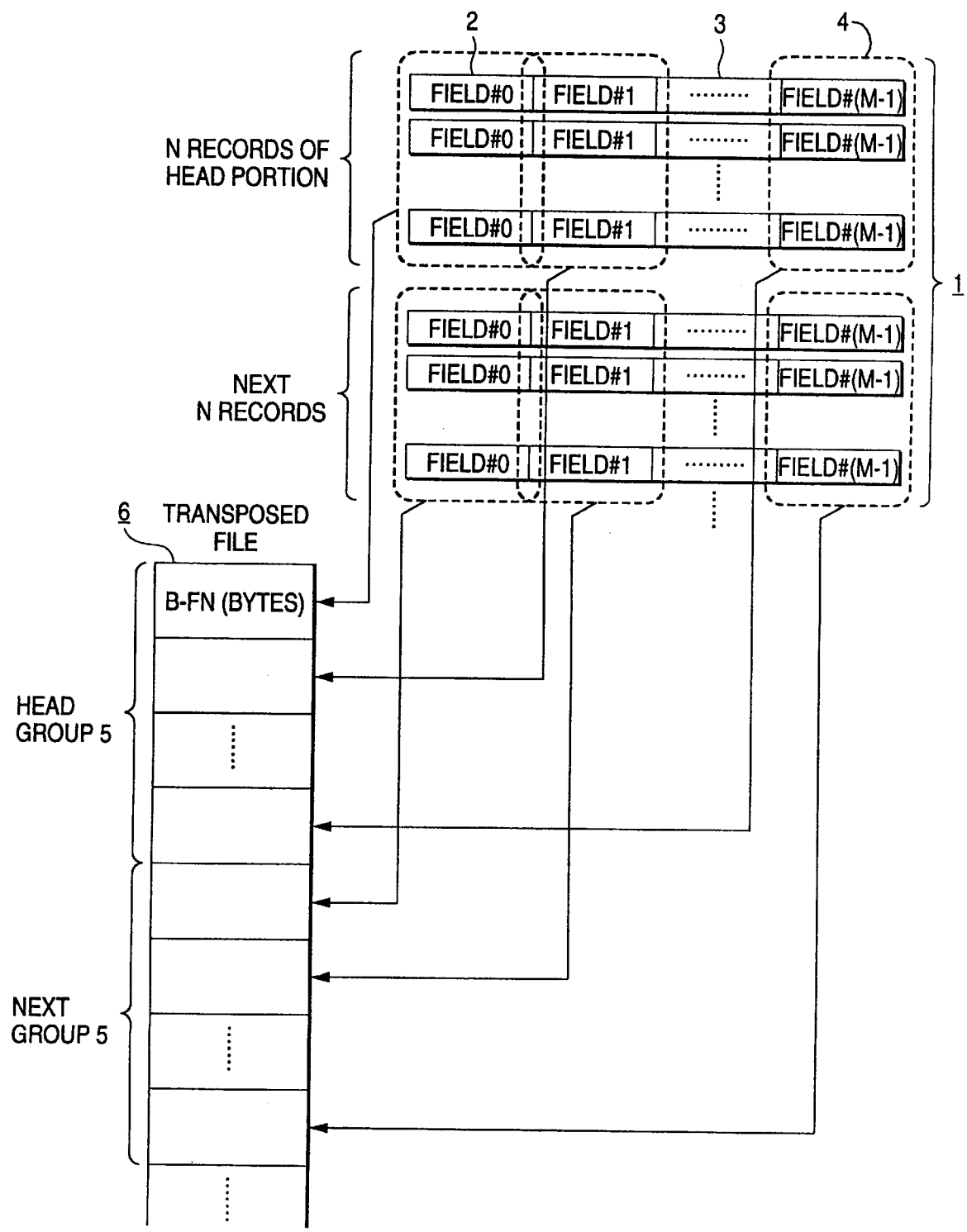
FIG. 1 is a schematic diagram for showing a method for producing a transposed file according to an embodiment 1 of the present invention.

FIG. 1 represents a method for producing a transposed file, according to an embodiment 1 of the present invention. Reference numeral 1 shows an original file for storing thereinto a plurality of records constituted by a plurality of fields 2. A preselected number of preset records, for example, N records of each of the plural fields are subdivided from the original file to be used as a block 4. All of these subdivided blocks 4 are coupled, or linked to each other so as to rearrange these coupled blocks as a group 5. As to all of the records, the subdivided fields are rearranged as the above-described groups 5, and thereafter these groups 5 are coupled to each other, so that a transposed file 6 is produced. In this case, both the field 2 and the record 3 each have fixed lengths.

Figure 2:
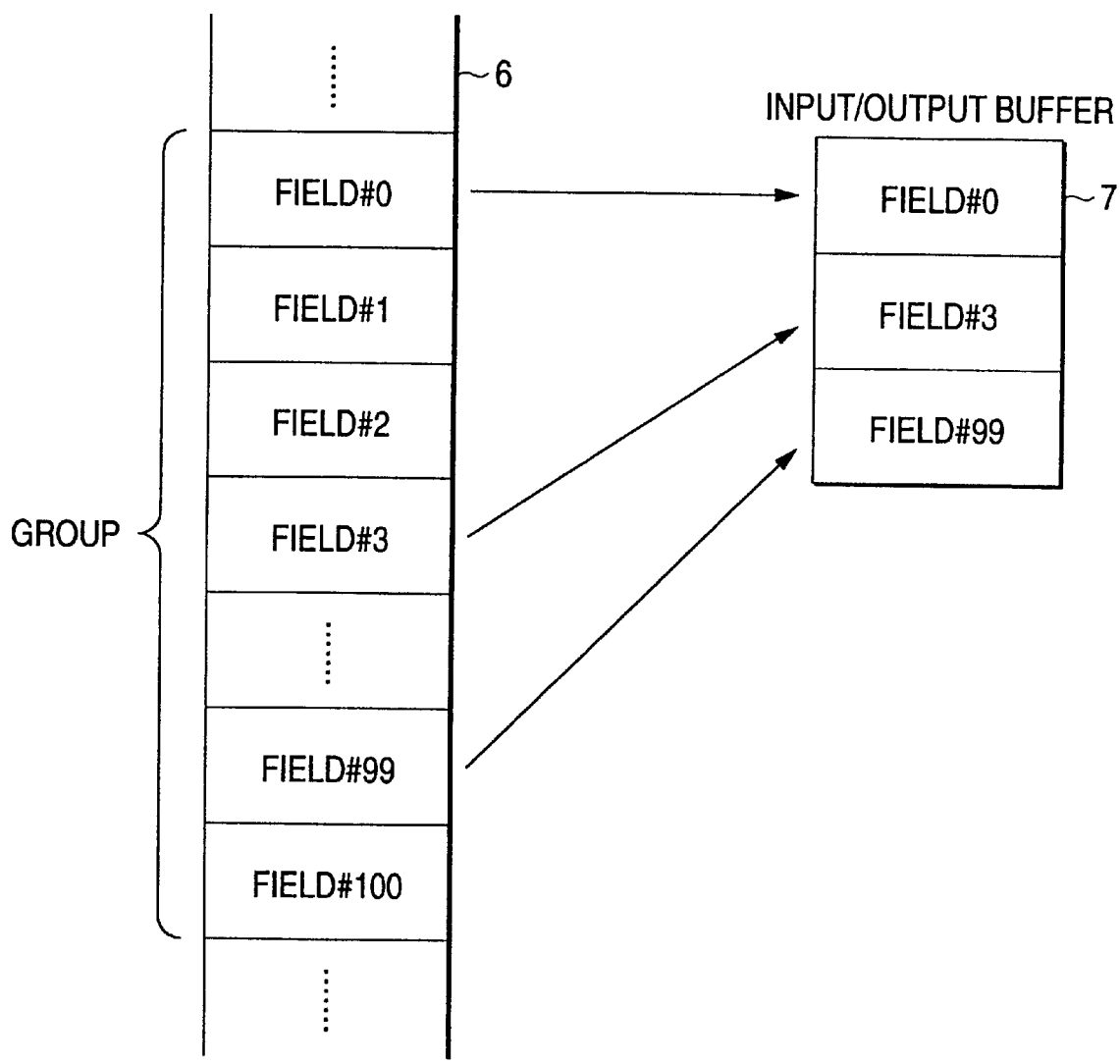
FIG. 2 is a schematic diagram for indicating that only necessary blocks are read to be stored into an input/output buffer according to the embodiment 1 of the present invention.

As indicated in FIG. 2, after the transposed file 6 has been formed, a group of the necessary fields 2, namely only the necessary blocks 4, may be read out and stored into an input/output buffer 7. As a result, buffer capacity can be reduced, and a high-speed processing operation can be realized.

(Embodiment 2)

Figure 3:
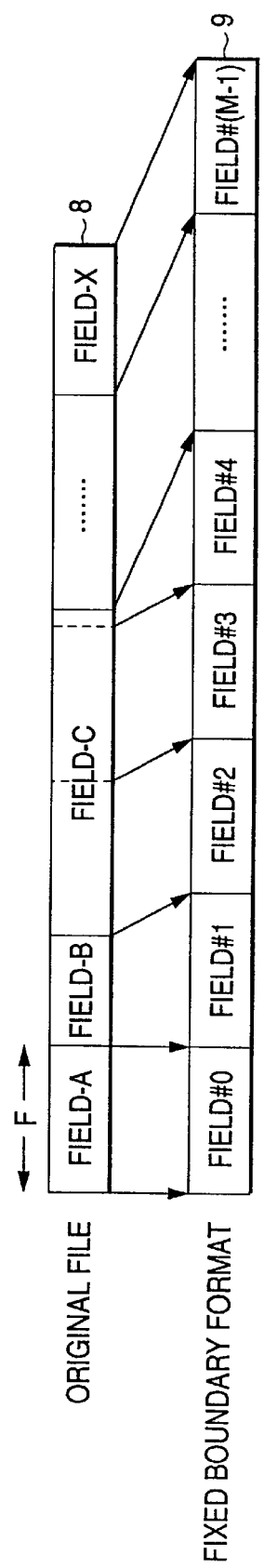
FIG. 3 is a file layout diagram for indicating a fixed boundary format, according to an embodiment 2 of the present invention.

FIG. 3 represents a format of a record according to an embodiment 2 of the present invention, namely one method for making a fixed length of a field when a record of an original file is not equal to a field having a fixed length. Reference numeral 8 indicates a record of an original file, and reference numeral 9 shows a fixed boundary format after a field has a fixed length. This drawing shows an example in which a field length is fixed to F bytes. For instance, as to a field "Field-B" having bytes smaller than the F bytes, this field is fixed to "Field, #1" by adding a blank. Also, another field "Field-C", having a field length exceeding the F bytes, is subdivided into 3 fields, and also a partial blank is added, so that this field "Field-C" is subdivided into a field "Field #2", another field "Field #3", and another field "Field #4". N records are collected for every field, so that a block having NF bytes can be made.

Since the field has the fixed length, high speed processing speed can be realized.

Figure 4:
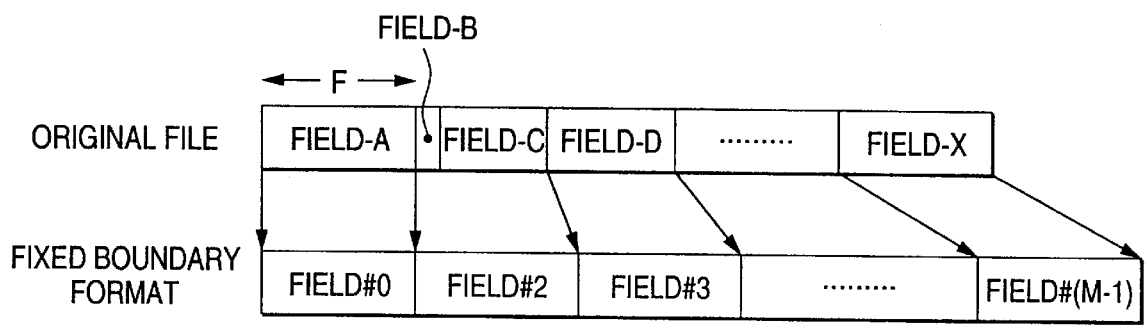
FIG. 4 is a schematic diagram for showing a method for collecting a plurality of fields located adjacent to each other to change the collected field into a field having a fixed length, according to the embodiment 2 of the present invention.

FIG. 4 indicates a modification of the embodiment 2. That is, this modification is capable of grouping a plurality of fields located adjacent to each other, so that these grouped fields can be changed into fields having fixed lengths. Since such fields having shorter field lengths can be handled as a group, the processing efficiency can be increased.

(Embodiment 3)

Figure 5:
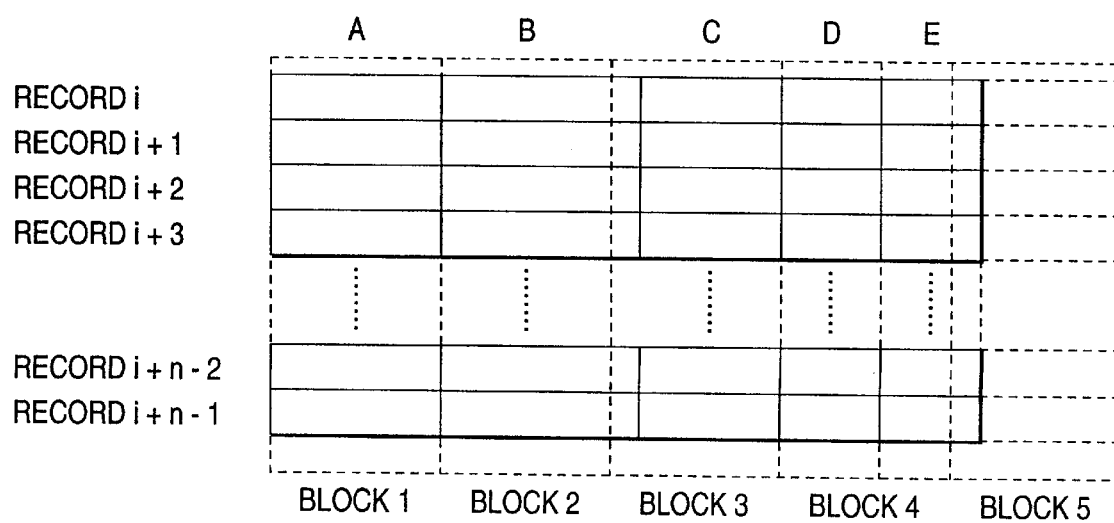
FIG. 5 is a schematic diagram for showing such a condition that a record format is subdivided, according to an embodiment 3 of the present invention.
Figure 6:
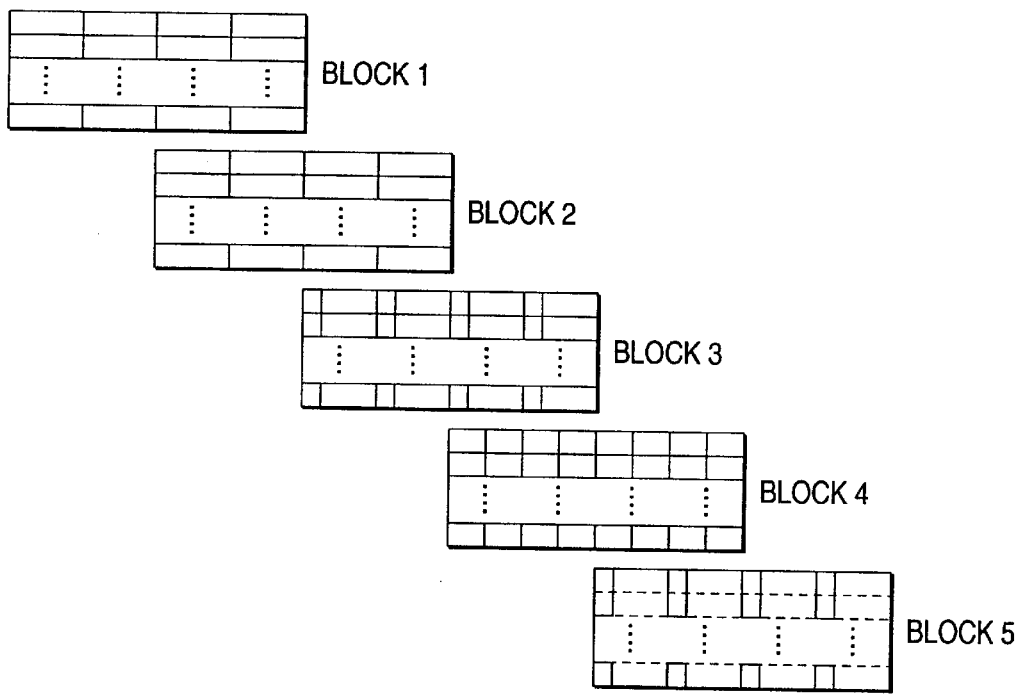
FIG. 6 is a schematic diagram for showing such a condition that a record format is subdivided, according to the embodiment 3 of the present invention.

FIG. 5 and FIG. 6 are diagrams for representing a condition so that a record format is subdivided in accordance with an embodiment 3 of the present invention. FIG. 5 indicates records of a data file from an i-th of record up to "n" records according to the conventional packaging method. The data are grouped in units of records, and the data are arranged in accordance with the order of the respective records, and further the data are arranged within each of the records in the order of definitions of this field. In accordance with the embodiment 3, this record is subdivided to be stored. For instance, this drawing shows such a case that a length for subdividing of a record is selected to be 4 bytes. First, each of the records is subdivided into 4 bytes. Since there is no limitation that a field length be equal to a number multiplied by 4, this field may be subdivided in half. The record portions subdivided in the above-described manner are grouped as a block in a such a manner that the subdivided record portions starting from the offsets within the same record are grouped for every record. The record portions within a block are arranged in the order of the records.

FIG. 6 represents this subdivision condition. A block 1 is constituted by collecting only 4-byte head portions of the respective records, and block 2 is constituted by collecting only portions of each of the records, which are defined from a $5^{th}$ byte position and up to 4 byte length. A final block 5 is made by collecting a final portion of each of the records. In such a case that a length of a record is not equal to the number multiplied by 4, padding is given to a final portion of this record so as to adjust the length of this record as 4 bytes. While these formed blocks are collected, a group of the records is stored. A group of blocks may be stored in the form of a portion of a file on a disk of a computer system.

A description will now be given of a sequential operation for adding a record of the data file with such a storage system.

First, an area capable of storing a plurality of blocks is secured on a disk, and a pointer indicative of a data adding position is set as a head of this area. The block size is equal to the properly selected number multiplied by 4, and the total number of blocks is equal to a value defined by dividing a minimum number multiplied by 4 by 4. This minimum number is larger than the length of a record to be stored by the data file.

Figure 7:
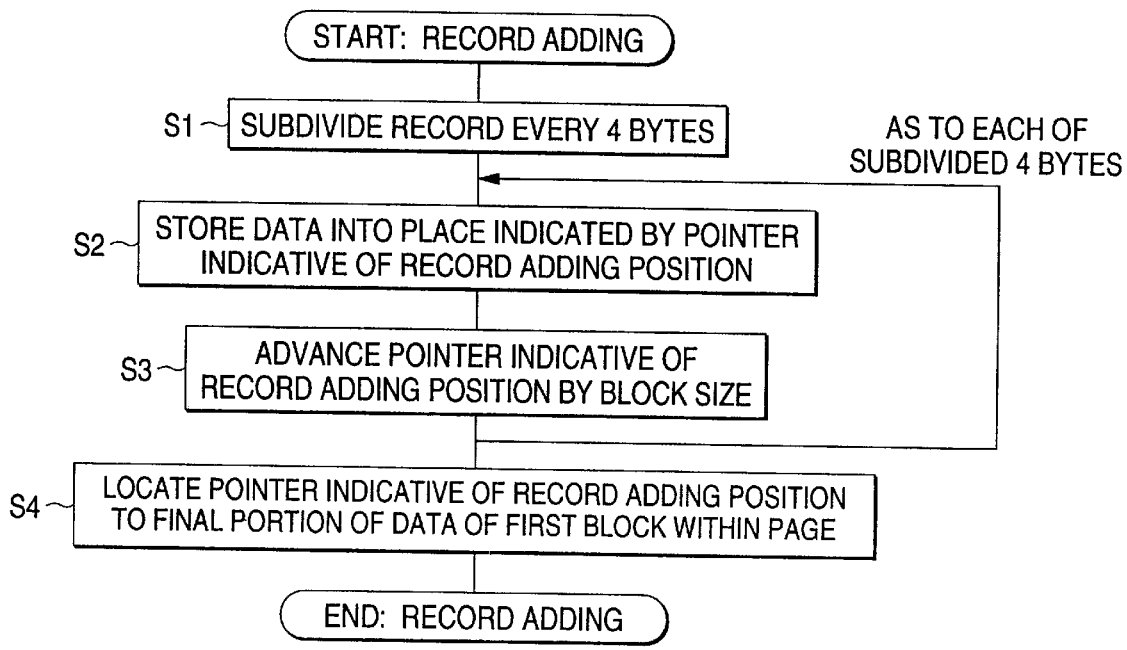
FIG. 7 is a flow chart for describing a sequential operation executed when one record is added to a secured region, according to an embodiment 3 of the present invention.

FIG. 7 shows a sequential operation in the case that one record is added to a secured region. A record to be added is subdivided in units of 4 bytes on a memory (step S1). A first 4-byte portion of the subdivided record is stored in a place indicated by a pointer which indicates a data adding position (step S2), and the pointer representative of the data adding position is advanced by the size of a block (step S3). A next 4-byte portion obtained by subdividing the record is successively stored in the place indicated by the pointer which indicates the record adding position. Every time a 4-byte portion is stored, the pointer indicative of the record adding position is advanced by the size of the block. After a final 4-byte portion obtained by subdividing the record has been stored, the pointer for indicating the record adding position is positioned at the final data within the first block (step S3).

Figure 8:
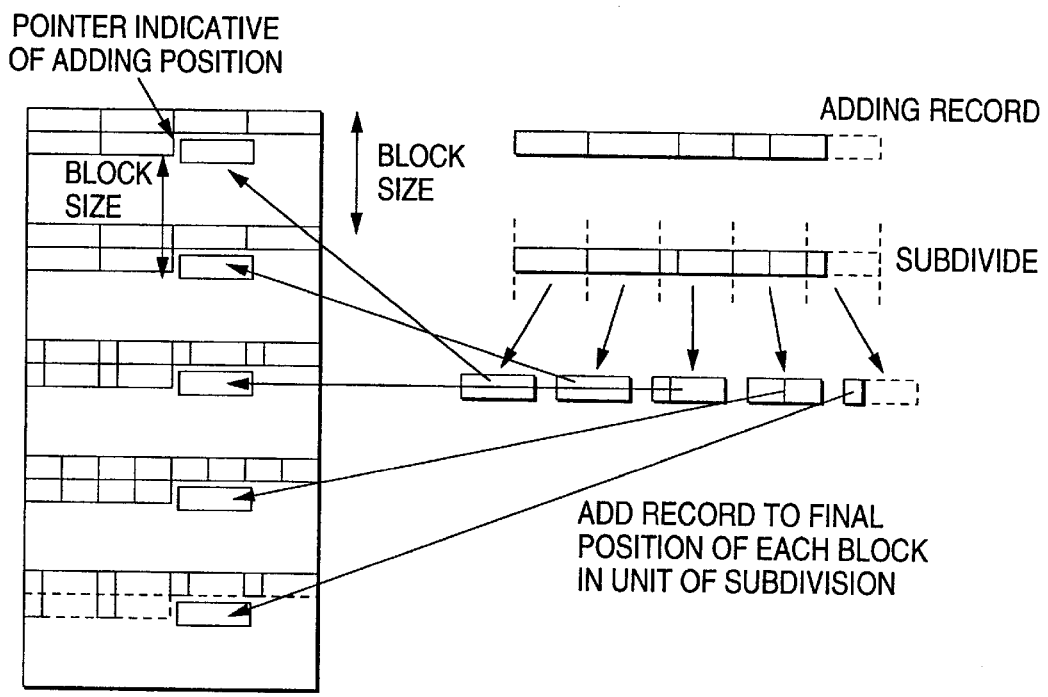
FIG. 8 is a schematic diagram for indicating a sequential operation executed when one record is added to the secured region, according to the embodiment 3 of the present invention.

FIG. 8 illustratively represents the process operation executed in accordance with the sequential operation of FIG. 7. In FIG. 8, the added record is subdivided, and what is obtained by dividing the record is added to the final position of each of the blocks.

Figure 9:
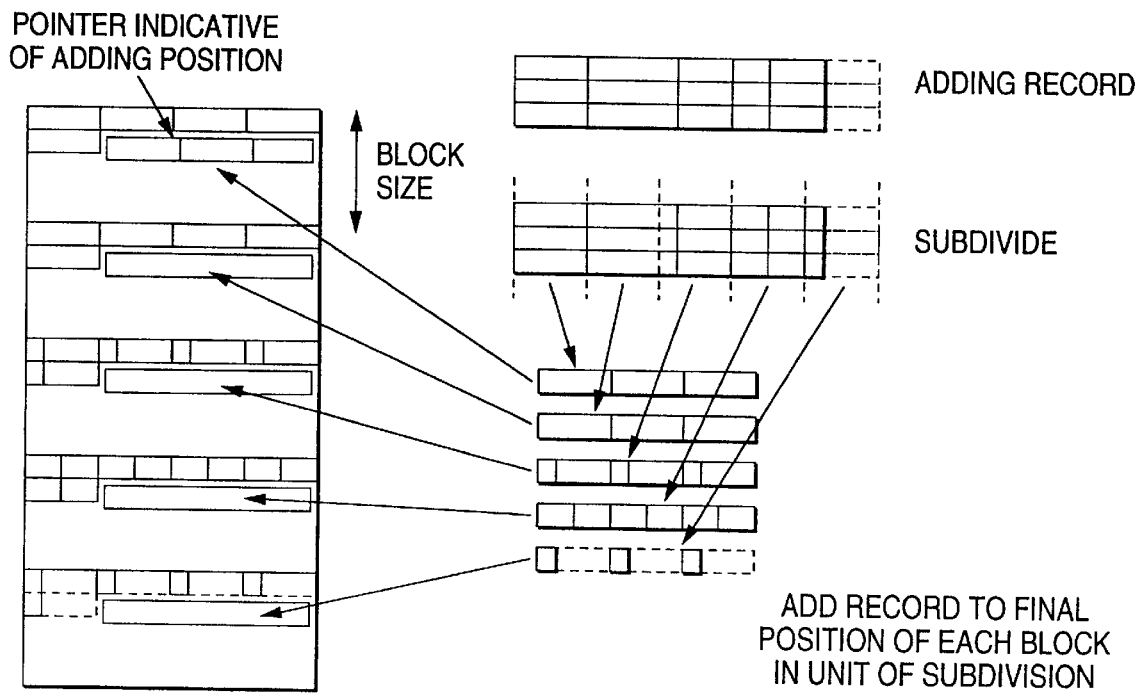
FIG. 9 is a schematic diagram for representing a sequential operation executed when a plurality of records are added in a batch mode into the secured region, according to the embodiment 3 of the present invention.

In the case that a plurality of records is added at one time, each of records is subdivided into a unit of 4 bytes on a memory, and while the same offset positions within the record of each of the records are collected, and the collected records are stored in the disk. For example, in the case that 3 records are added one time, 4-byte portions obtained by subdividing the record, are collected on the memory in such a manner that the same offset portions within a record of the 3 records are collected to produce a 12-byte portion. Each of the 12-byte portions is stored in a place indicated by a pointer indicative of a record adding position. This condition is indicated in FIG. 9.

Figure 10:
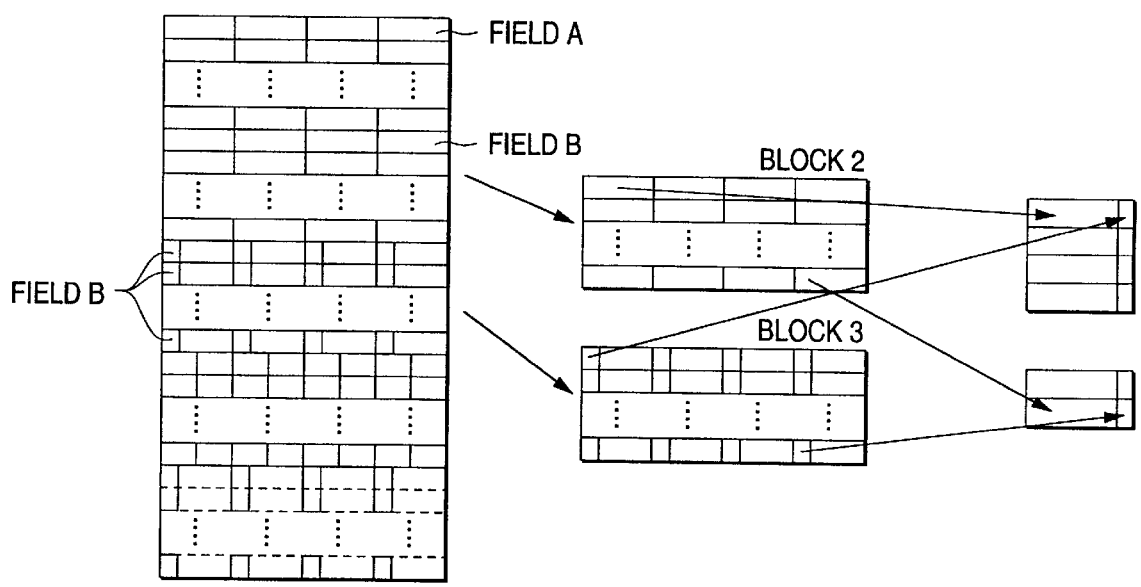
FIG. 10 is a schematic diagram for showing a sequential operation performed when data which has been subdivided/stored is read according to the embodiment 3 of the present invention.

Next, a description will now be given of a sequential operation executed when the data subdivided/stored in the above-described manner is read out. For example, as illustrated in FIG. 10, when a field "A" is required, since the field "A" is stored only in a block 1, only the block 1 is read out from the disk apparatus to be extended on the memory. When a field B is required, since the field B is stored bridging a block 2 and another block 3, both the block 2 and the block 3 are read onto the memory and then only this field B is derived from these blocks on the memory to be utilized.

A block required to read a certain field is calculated based on definition information about a field when data is inputted from a data file. In case an offset within a record of a necessary record is selected to be "P" (0 origin) and a length of a field is selected to be "L", a block to be read may be obtained based upon the below-mentioned calculation: (blocks from block "i" up to block "j" must be read)

$$i=INT(P/4)+1,$$

$$j=INT((P+L-1)/4)+1,$$

where symbol "INT(X)" indicates a minimum integer less than or equal to "X".

As previously explained, since the records are subdivided to be stored, only the record portion required in the reading operation are read, so that the data read time from the disk can be shortened.

Furthermore, since the subdivision unit is not equal to the field unit, but equal to a value such as 4 bytes which has no meaning with the field definition, even when the data file is the same, but the field definition information thereof is changed, such a change in the field definition information can be properly processed as follows. That is, when the data is inputted, only the necessary block is calculated based upon the field definition information (namely, lengths of offset and field within record) without giving any adverse influence to the data file storage system.

(Embodiment 4)

When records are arranged in a simple record order of every basic unit, a specific set of cache TLB is accessed in a concentration manner. It is predictable that a miss hit caused by collisions frequently occurs. Since a virtual memory is not used, the collisions of TLB can be avoided. However, there is a still small possibility that TLB collides with each other in a software process operation. A collision of an entry may be avoided by, for example, skewing a record starting position by a predetermined value.

Figure 11:
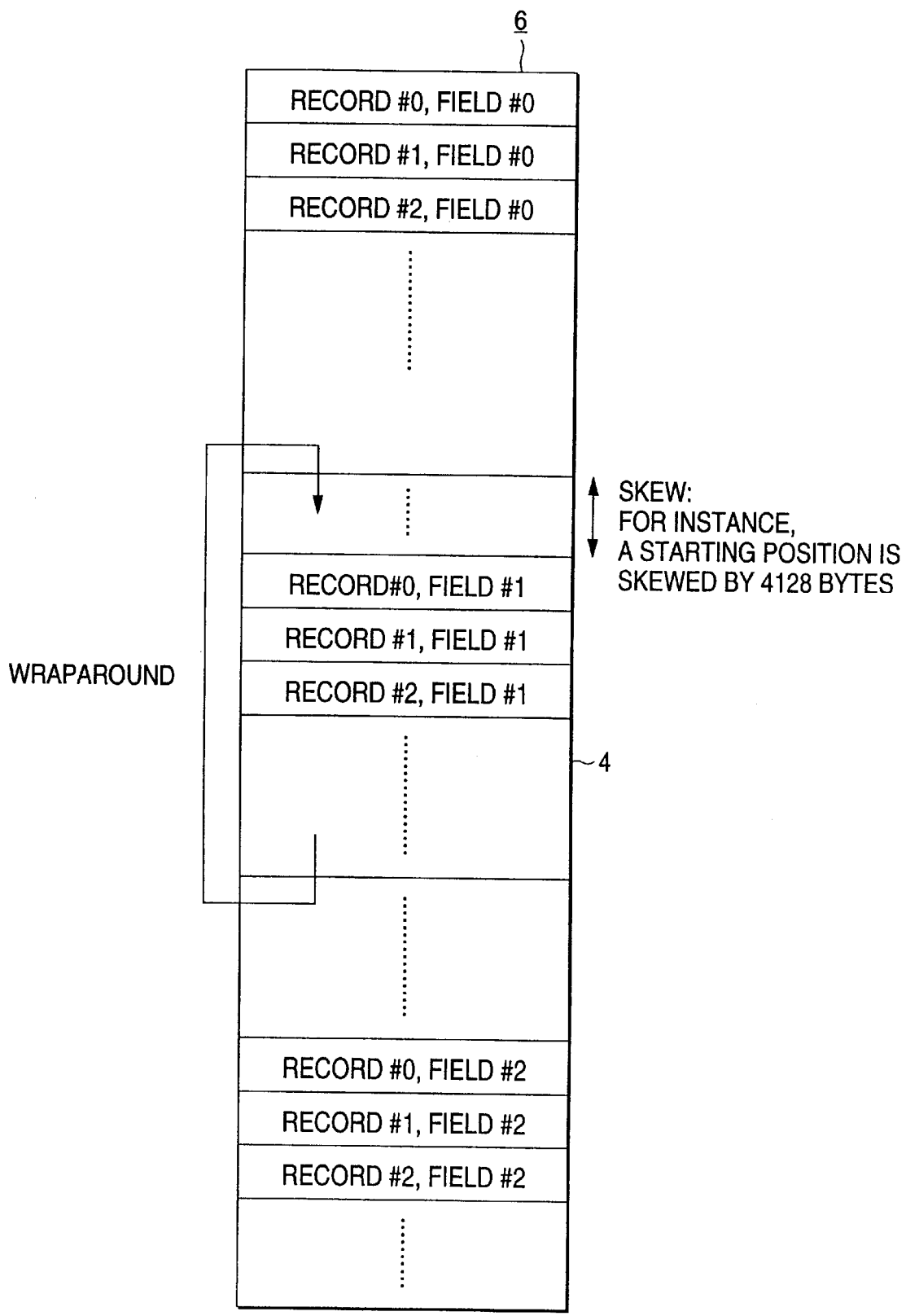
FIG. 11 is a file layout diagram for indicating structures of the respective blocks within a transposed file, according to an embodiment 4 of the present invention.

FIG. 11 represents a structure of each block 4 within a transposed file 6 according to an embodiment 4 of the present invention. Assuming now that a collision of TLB is avoided by taking account of an efficiency when a software process operation is carried out, if a skew of a page size+a cache block size (for example, S=4096+32=4128 bytes) is secured, then this TLB collision can be avoided. The record within each of the blocks 4 is arranged in a wrap around manner so that only a skewed record portion is returned to a head portion to be circulated.

As previously described, the record order within the block 4 is changed for every block 4, so that it is possible to avoid eccentric access operation.

As another method for avoiding the above-described eccentric access operation, the following method may be employed. That is, the coupling order of the above-described blocks 4 within the group 5 is changed for every group.

In particular, this alternative method may become effective in such a case that the capacity of the transposed file 6 is large, and a large number of groups are provided.

(Embodiment 5)

Figure 12:
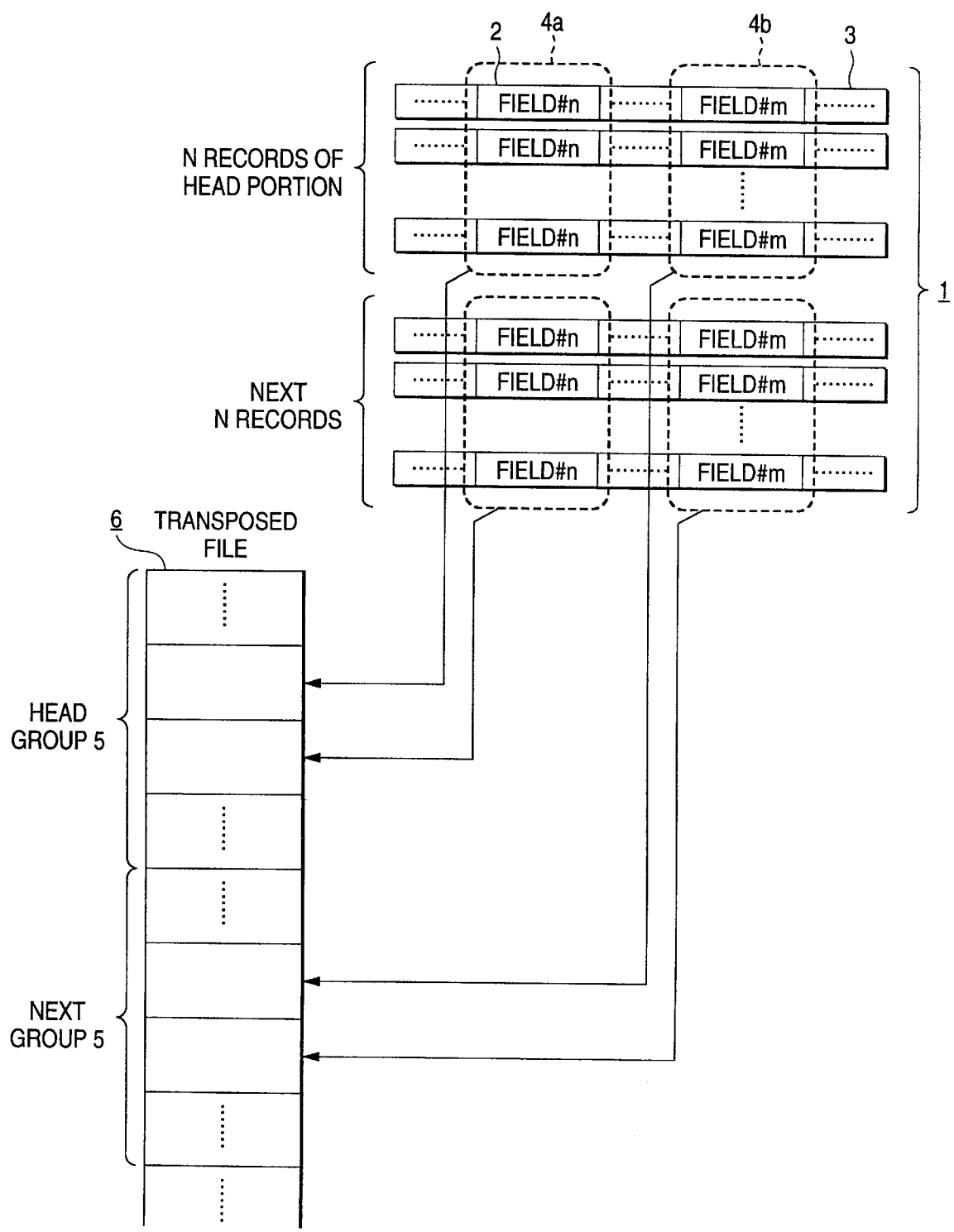
FIG. 12 is a schematic diagram for showing a method for forming a transposed file, according to an embodiment 5 of the present invention.

FIG. 12 shows a method for producing a transposed file according to an embodiment 5 of the present invention. That is, FIG. 12 indicates a condition so that blocks located adjacent to a field 2 which may be simultaneously referred to are rearranged.

In such a case that there are plural fields which may be simultaneously referred to when a data retrieve operation is carried out due to a characteristic specific to the field 2, when a transposed file is produced, such fields are preferably arranged adjacent to each other within the group, by which the processing speed during the retrieve operation can be increased.

In FIG. 12, as a set of fields which may be simultaneously referred to when the data retrieve operation is carried out, there are provided a block 4a and a block 4b. These two fields are arranged in the record 3 at positions spaced apart from each other. When the transposed file 6 is produced, these two fields are arranged adjacent to each other, so that the readout time from a disk apparatus (not shown) storing therein the transposed file 6 can be shortened, and the highspeed process operation can be realized.

(Embodiment 6)

Figure 13:
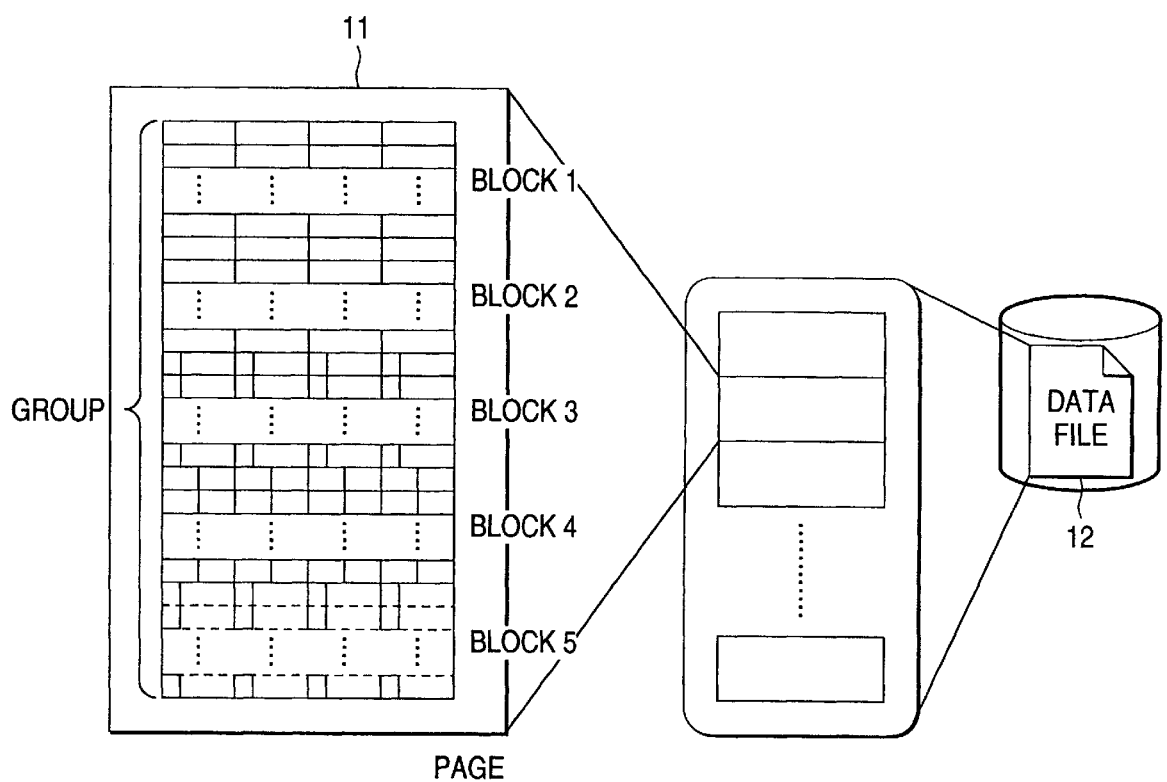
FIG. 13 is a schematic diagram for indicating a method of processing units of a page (group) in a transposed file, according to an embodiment 6 of the present invention.

FIG. 13 is a diagram representing an example of a data processing method in a unit of a page in a transposed file 6 which is produced by subdividing a record format by 4 bytes according to an embodiment 6. A block size is determined as a certain constant value. In each of the blocks, a preselected number of 4-byte-portions obtained by subdividing a record are collected and stored. As a result, since these blocks are collected, a unit storing a constant number of records can be formed. This unit is assumed to be a page 11. Alternatively, one page 11 may be used as the same unit as that of 1 group 5 in the embodiment one. In the case that a record 3 is added which exceeds the record number capable of being stored as one page 11, another page 11 is added. A data file 12 is formed as a set of plural pages.

Figure 14:
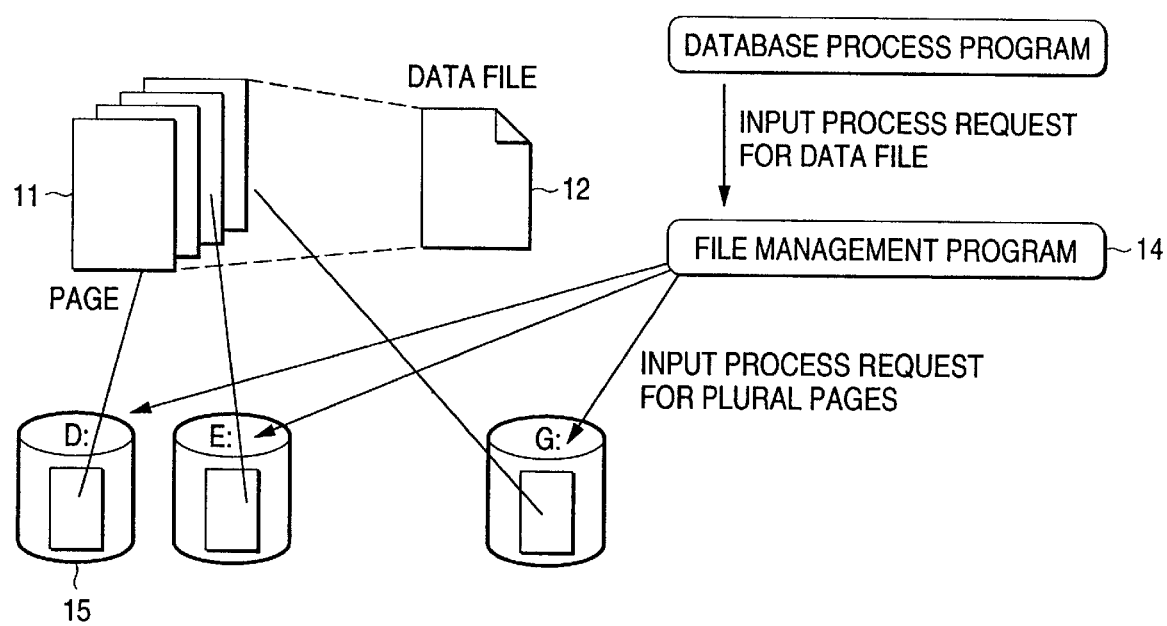
FIG. 14 is a schematic diagram for representing such a condition that pages for constructing a data file are distributed to disk apparatus, according to an embodiment 6 of the present invention.

FIG. 14 is an illustration in which a plurality of pages 11 constituting a data file 12 are distributed into different disk apparatus 15 and stored therein by a file management program. How to distribute the pages 11 constituting a single data file 12 into the disk apparatus 15 may depend upon a user definition, or a definition of a system manager. If an input request of a data file containing a data reading process program, such as a database process operation, is issued to a file managing unit (not shown), since the file management program 14 determines which of the pages constructing the subject data file 12 are distributed to which disk apparatuses to be stored therein, these pages are disassembled in the input process operation in units of a page, with respect to a plurality of disk apparatus 15 in accepting this process request in the process operation. In this drawing, since the pages 11 for constructing the data file are distributed into a plurality of disk apparatuses 15 named as "D:", "E:", - - - , and "G:" and stored thereinto, the data reading process request for the data file 12 may be processed in the file managing unit in such a format that the input process for the respective pages 11 stored in a plurality of disk apparatus 15 are carried out in parallel.

As previously described, since the data files 12 are arranged from the plural pages 11 saved in the different disk apparatus 15, the input process operation from the data file 12 can be disassembled into the input requests issued from the pages 11 saved in the plurality of disk apparatus 15. As a consequence, the parallel degree of the inputs from the data file 12 can be increased, and thus the processing speed can be increased.

Figure 15:
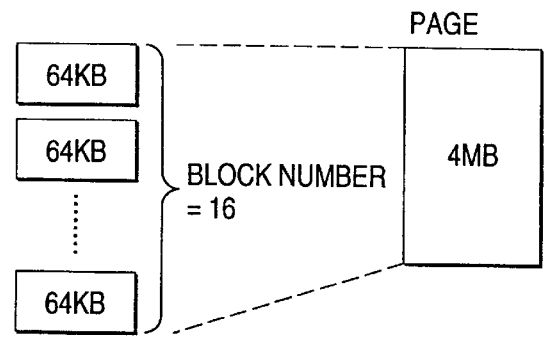
FIG. 15 is a schematic diagram for denoting such a condition that a size of a block is changed in response to a record length, according to the embodiment 6 of the present invention.
Figure 15:
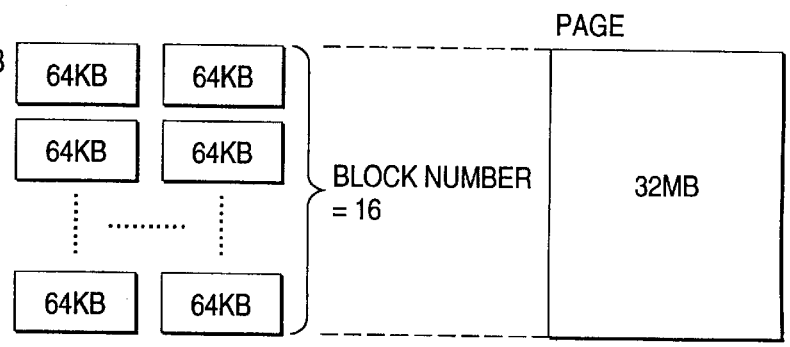
Figure 15:
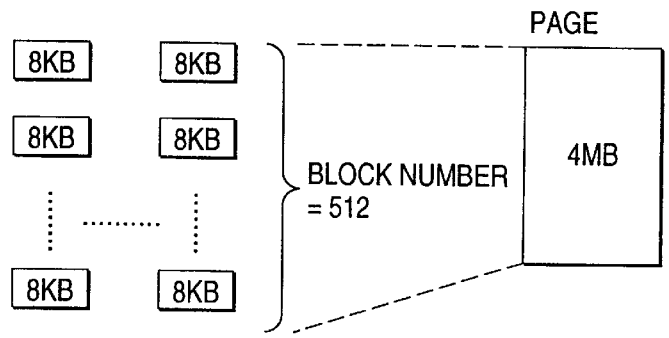

Alternatively, when a block is produced, the size of the block may be changed in response to the record length. For instance, as indicated in FIG. 15, when the record length is selected to be 256 bytes, the record is subdivided into 64 blocks. When a size of this block is selected to be 64 KB, the size of a page becomes 4 MB. When the record length is selected to be 2048 bytes, since this record is subdivided into 512 blocks, if the size of this block is selected to be 64 KB, the size of the page becomes 32 MB. When the size of a page is increased, a total number of pages with respect to a data file having the same capacity is decreased. As a result, this may impede the above-explained effect of this embodiment, increasing the parallel degree of the process operations while the pages are distributed in different disk apparatuses 15. As a consequence, when the size of the block is selected to be 8 KB, the size of the page may be suppressed to 4 MB as in the case that the record length is equal to 256 bytes. Furthermore, when a size of a block is set to be excessively small in order to increase the total number of pages, the amount of data which can be read within one time is decreased in the input process operation in units a block. This may cause lowering of the process performance. As a result, the block size must be properly controlled.

As previously described, since the size of the block can be changed based upon the record length, the processing speed can be controlled while maintaining the effect of improving the parallel degree irrespective of the record length.

(Embodiment 7)

Figure 16:
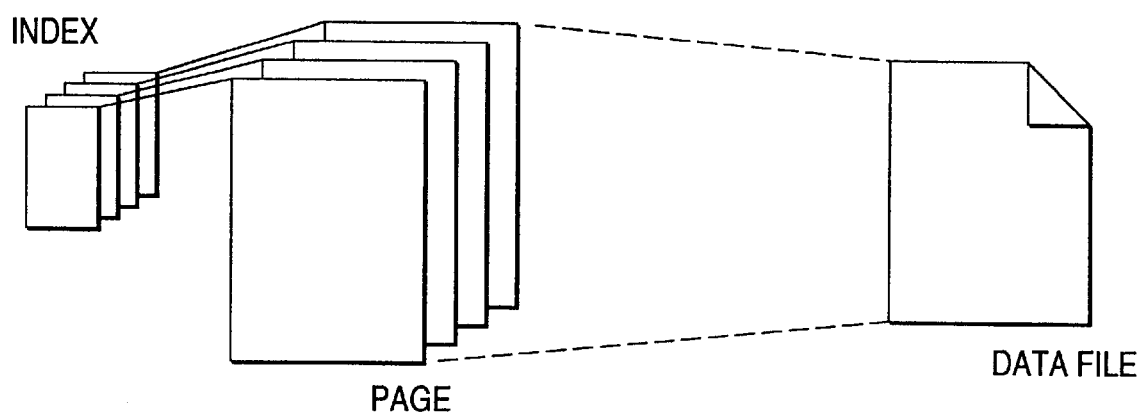
FIG. 16 is a schematic diagram for showing a method for storing records, according to the embodiment 7 of the present invention.

FIG. 16 represents a method for storing records according to an embodiment 7 of the present invention. In this embodiment, when records constituting a data file are stored, a unit used to store a preselected constant number of records is formed. This unit is set as a page. A unit of one page may be arbitrarily set to the unit of one group 5 in the embodiment one, or the unit of 1 page in the embodiment 6. A data file constituted by such -records exceeding a total number of records stored in one page is arranged as a plurality of pages. An index indicative of a characteristic of data existing in pages is provided in each of these pages. In a retrieve process operation for seeking a record which satisfies a certain condition from the data file, a judgment is made as to whether or not a subject page may contain the record capable of satisfying the condition by investigating the index of the characteristic of this page. A page which is determined to contain the record capable of satisfying the condition is selected as a page to be retrieved, whereas a page which is judged not to contain the record capable of satisfying the condition is selected as a page out of the retrieve operation.

As previously explained, since the record is subdivided in unit of pages and the index of each of the pages is employed in order to judge as to whether or not each of these pages is to be retrieved, the retrieve process operation for the necessary pages can be omitted and therefore a high speed retrieve process operation can be carried out.

Figure 17:
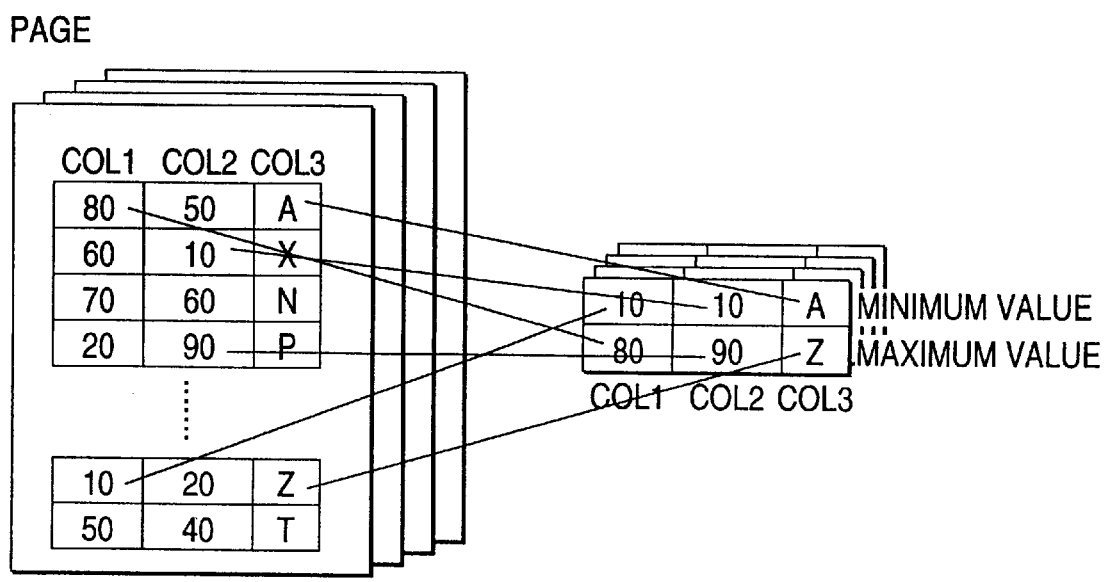
FIG. 17 is a schematic diagram for indicating the record storing method with employment of maximum value/minimum value, according to the embodiment 7 of the present invention.

FIG. 17 is a diagram for showing a method of storing a record with a maximum value/a minimum value as an index indicative of a characteristic of data according to this embodiment. As to a record contained in each of the pages, areas for managing a maximum value/a minimum value of each field are prepared. The area for managing the maximum values is arranged by a combination of such fields having the maximum values among all of records within this page, whereas the area for managing the minimum values is arranged by a combination of such fields having the minimum values among all of records within this page. In a process operation for selecting a record based on a value of a certain field, this value is compared with the maximum value/minimum value of this field so as to judge whether or not the record to be selected is contained in this page. If the record to be selected is contained in this page, then the records contained in this page are retrieved. If the record to be selected is not contained in this page, then this page is not processed.

Figure 18:
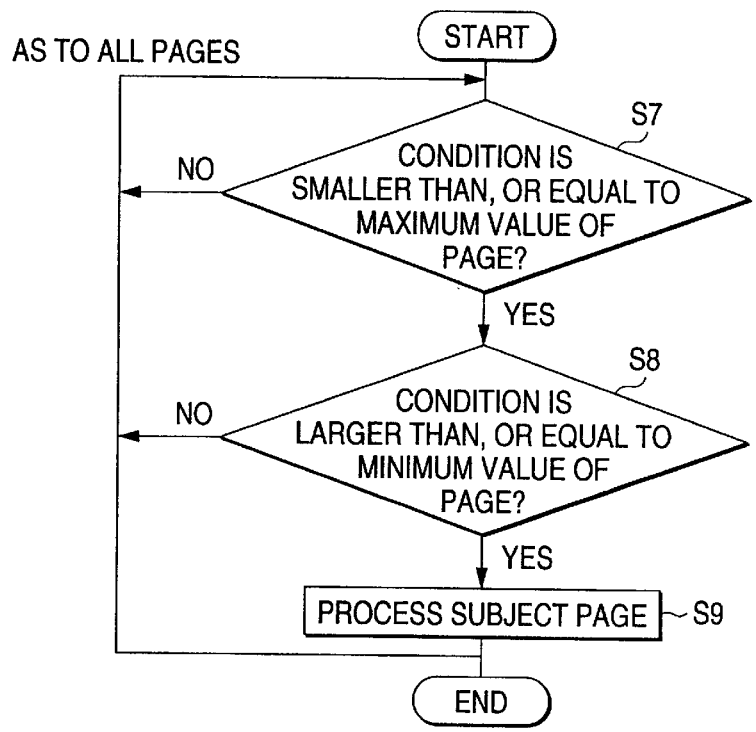
FIG. 18 is a flow chart for describing the record storing method with employment of maximum value/minimum value, according to the embodiment 7 of the present invention.

FIG. 18 is a flow chart for representing a selection process operation executed in unit of a page. In this flow chart, as to a certain page, a comparison is made as to whether or not the retrieve condition is smaller than, or equal to the maximum value of this page (step S7). If NO, then the process operation is advanced to the next page. Conversely, if YES, then another comparison is made as to whether or not this retrieve condition is larger than, or equal to the minimum value of this page (step S8). If NO, then the process operation is advanced to a further page. Conversely, if YES, then this page is to be processed (step S9). While this process operation is repeatedly executed, such a judgment is made as to whether or not the records to be processed are contained in all of the pages with respect to all pages.

(Embodiment 8)

Figure 19:
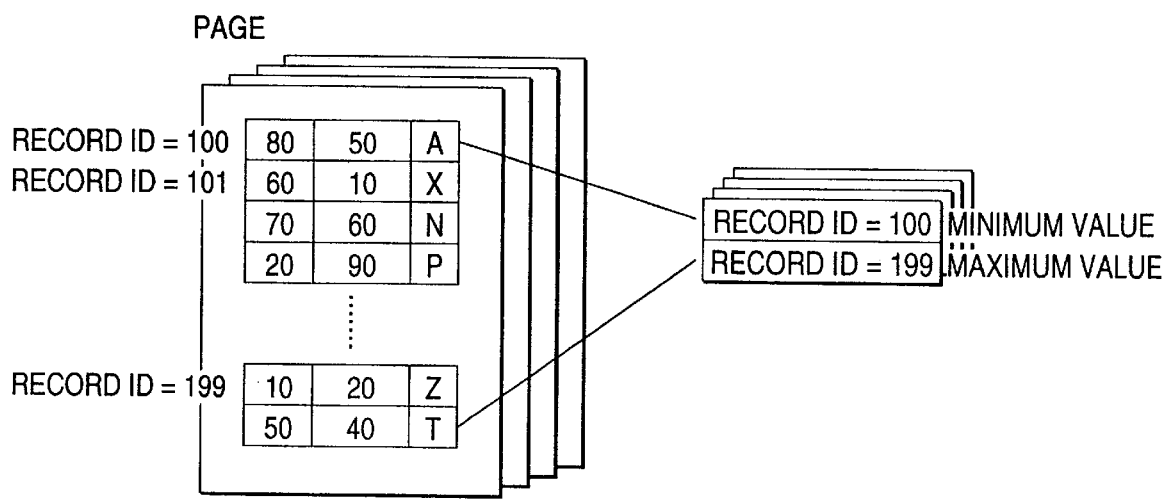
FIG. 19 is a schematic diagram for indicating a method, according to an embodiment 8 of the present invention.

FIG. 19 is a diagram representing an example of a processing method according to an embodiment 8 of the present invention. Either a record ID indicative of an entering order of a record or a time stamp representative of an entering time instant thereof is prepared. An area for managing an initial value and a final value of this record ID, or the time stamp in unit of a page is prepared. In such a case that only data for a certain time period is desirably processed among records of a data file, a range of this record ID, or this time stamp is designated, and then the data is compared with the initial value/final value of either the record ID or the time stamp of each page in order to judge as to whether or not the record to be processed is contained in this page. If the record to be processed is contained in this page, then the record contained in this page is processed. If the record to be processed is not contained in this page, then this page is not processed. For example, with respect to the data file for containing the records for the past 3 years, when only the records stored last October are to be processed, only such a page containing the records stored last October is to be processed by comparing the time stamps.

Figure 20:
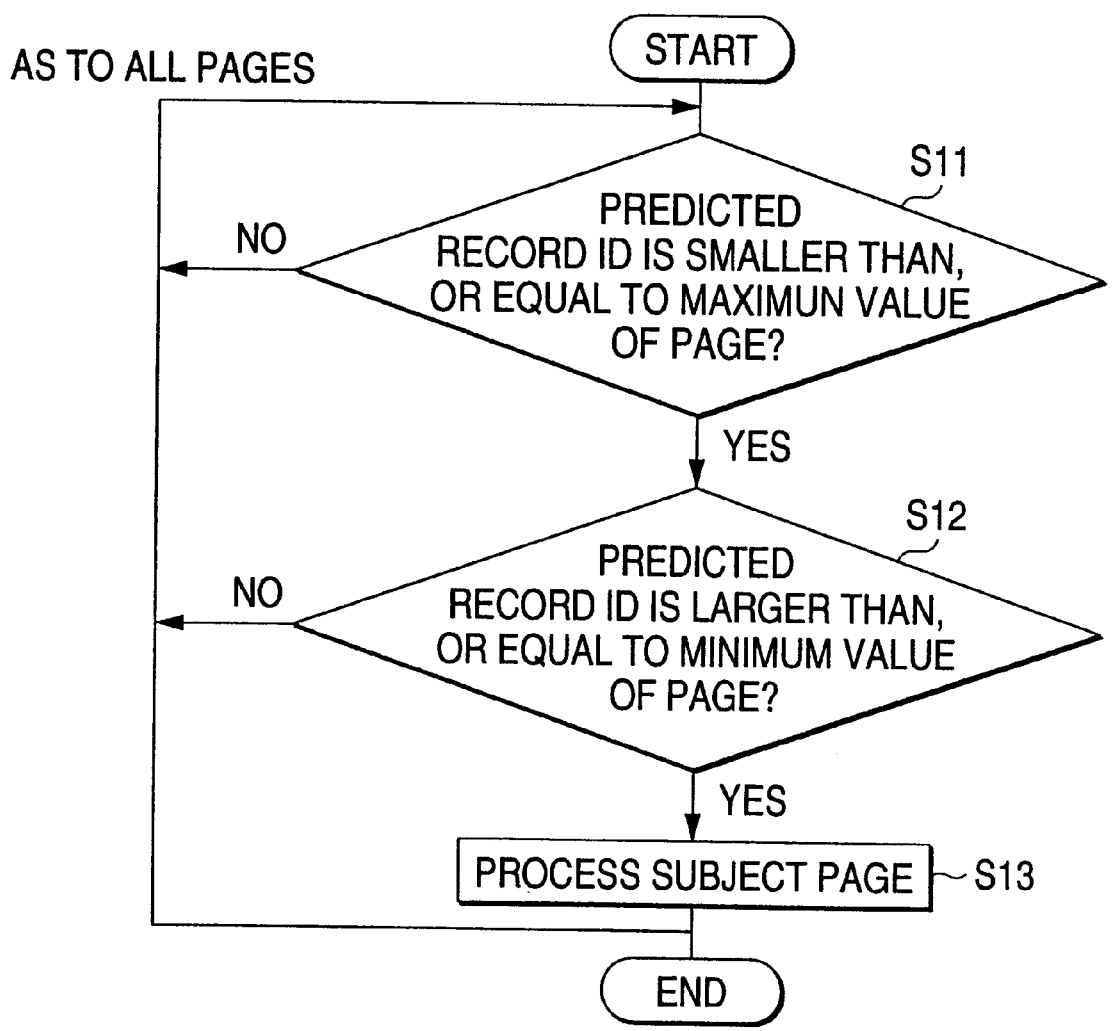
FIG. 20 is a flow chart for describing the method, according to the embodiment 8 of the present invention.

FIG. 20 is a process flow chart for explaining a selecting process operation executed based upon a record ID in units of a page. In this drawing, a check is made as to whether or not a designated record ID is smaller than, or equal to a maximum value of this page (step S11). Next, another check is made as to whether or not the designated record ID is larger than, or equal to a maximum value of this page (step S12). A page capable of satisfying the conditions defined at the above-described steps S11 and S12 is to be processed (step S13). The retrieve operation is accomplished by executing the above-explained process operation as to all of the pages.

As previously explained, since the selecting process operation using the entering timing of the record can be carried out in units of a page, the processing efficiency of the record selecting process operation can be increased.

(Embodiment 9)

When pages are actually stored into a disk apparatus, these pages are stored in units of a page as one file of a file system provided by an operating system of a computer system. In this case, one page is used as one file, or a plurality of pages are used as one file.

Figure 21:
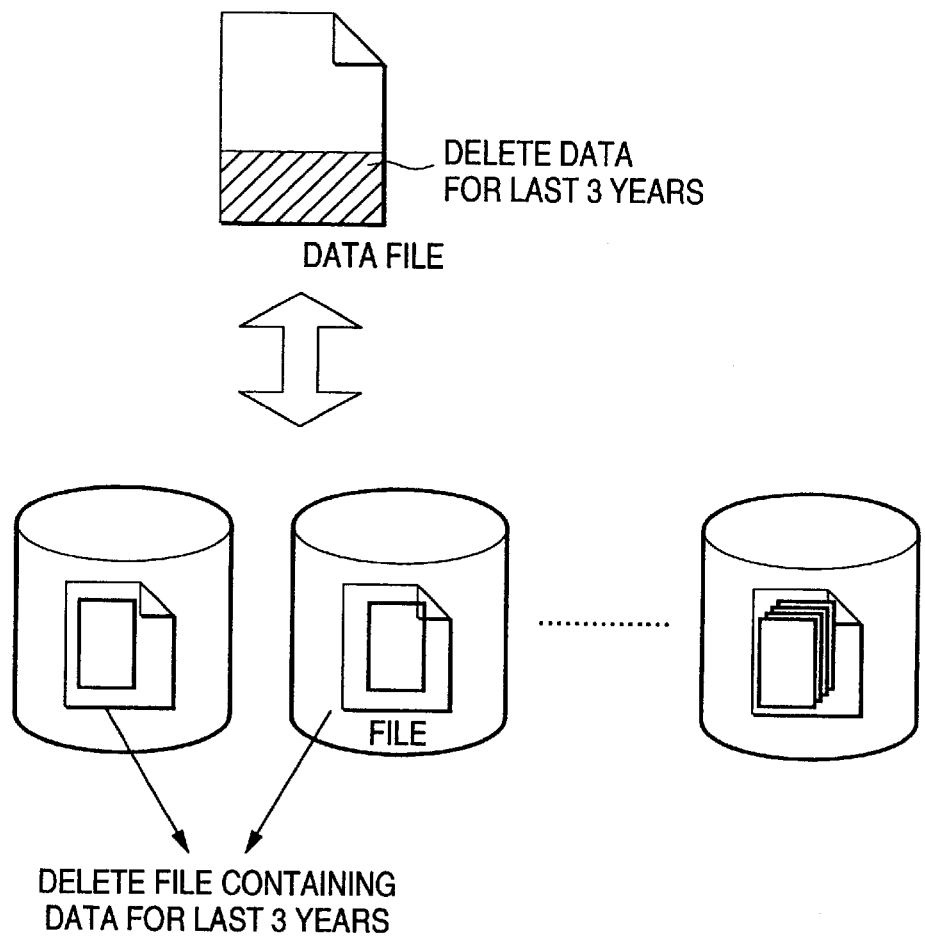
FIG. 21 is a schematic diagram for showing a partial deletion of a data file, according to an embodiment 9 of the present invention.

As previously explained, since one data file is subdivided into a plurality of files to be managed, it is possible to easily execute such a process operation for partially deleting the data file. For example, FIG. 21 indicates a processing method according to an embodiment 9 of the present invention. In this processing method when a deletion is made of a page containing the oldest records saved by each year from the data files saved for the past 3 years, only the disk apparatus containing the page to be deleted is selected, and further the page is deleted in a parallel processing operation, so that such a high speed process operation can be carried out, for instance, the data file is partially deleted.

(Embodiment 10)

Figure 22:
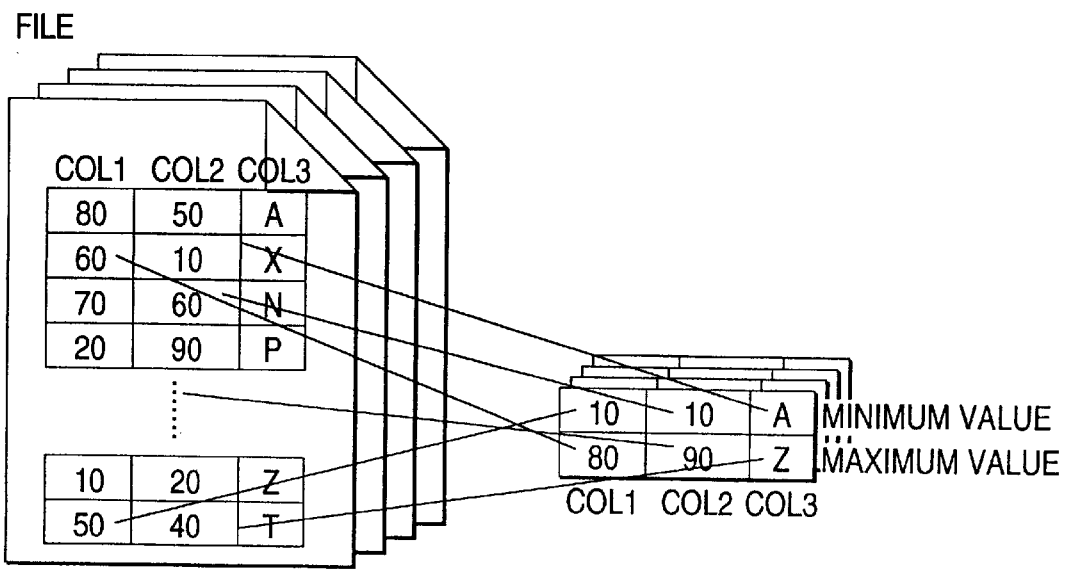
FIG. 22 is a schematic diagram for representing a method according to an embodiment 10 of the present invention.

FIG. 22 is a diagram for indicating a processing method according to an embodiment 10 of the present invention. As shown in this drawing, with respect to a record contained in each of files for subdividing/managing a data file, areas for managing a maximum value/a minimum value of each field are prepared. The area for managing the maximum values is arranged by a combination of such fields having the maximum values among all of records within this file, whereas the area for managing the minimum values is arranged by a combination of such fields having the minimum values among all of records within this file. In a process operation for selecting a record based on a value of a certain field, this value is compared with the maximum value/minimum value of this field so as to judge whether or not the record to be selected is contained in this file. If the record to be selected is contained in this file, then the records contained in this file are retrieved. If the record to be selected is not contained in this file, then this file is removed from the subject to be processed.

As previously explained, since the selecting process operation can be carried out based upon the condition with respect to the value of the field of the record in units of a file, the processing efficiency of the record selecting process operation can be increased.

(Embodiment 11)

Figure 23:
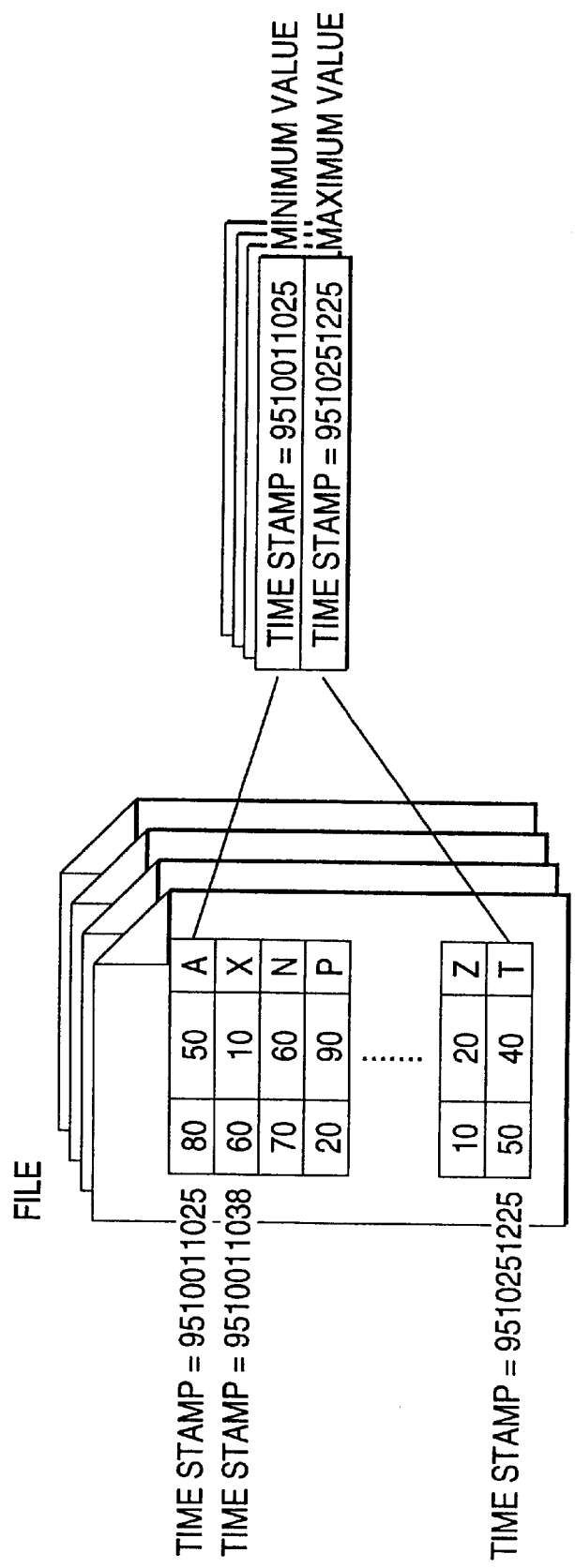
FIG. 23 is a schematic diagram for representing a method according to an embodiment 11 of the present invention.
Figure 24:
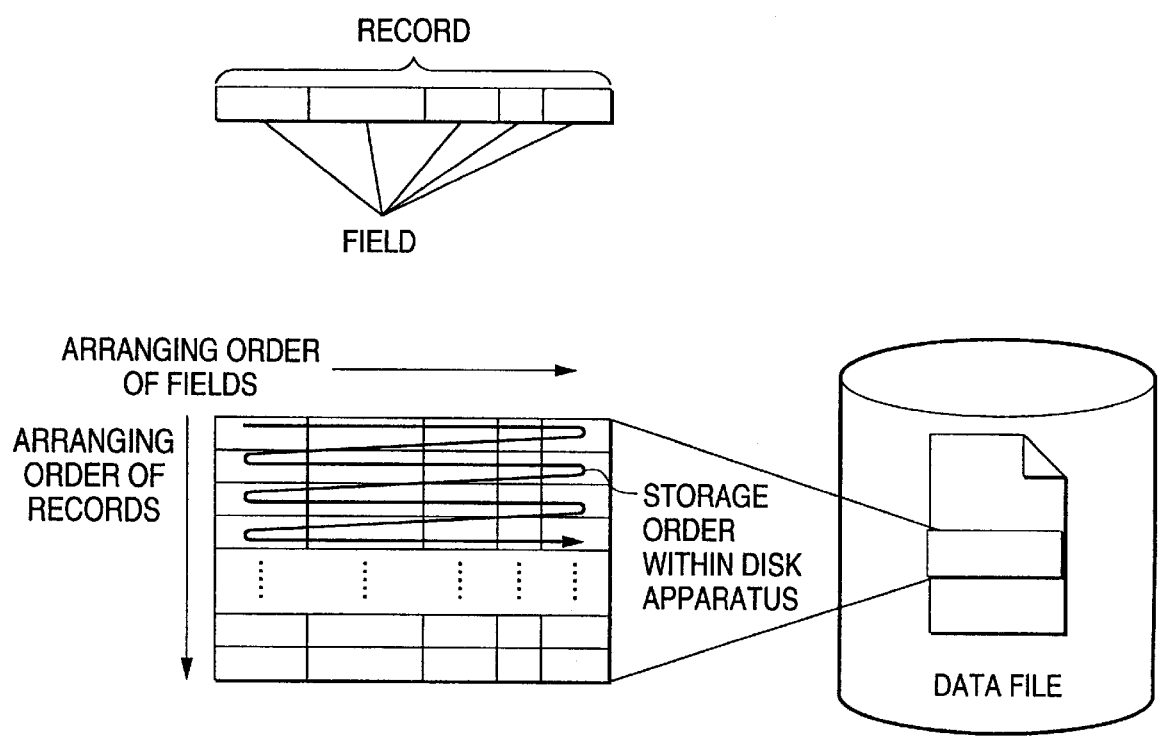
FIG. 24 is a schematic diagram for indicating the conventional file managing method.
Figure 25:
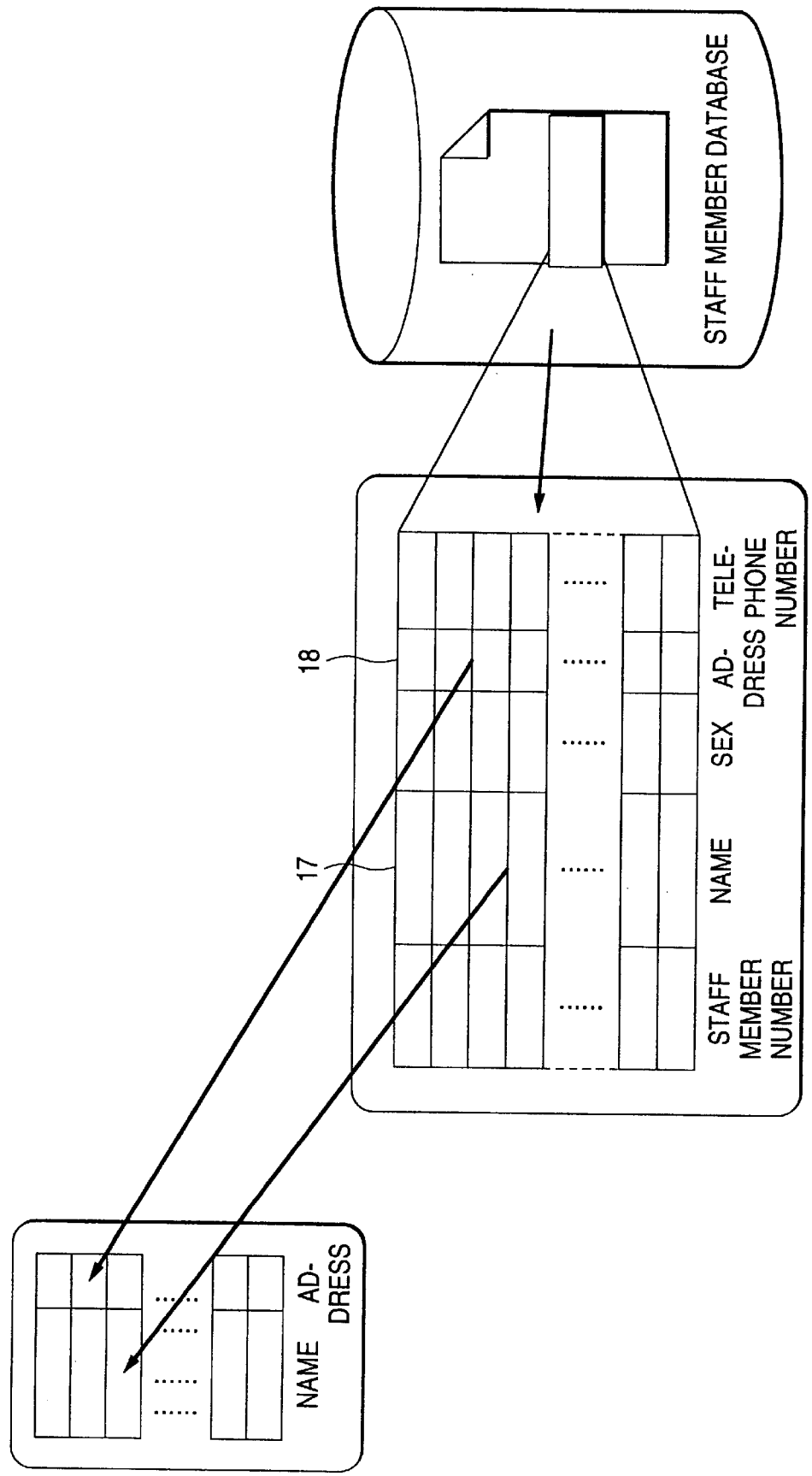
FIG. 25 is a schematic diagram for representing the field deriving process of the prior art.

FIG. 23 is a diagram for representing an example of a processing method according to an embodiment 11 of the present invention. As indicated in this drawing, either a record ID indicative of an entering order of a record or a time stamp representative of an entering time instant thereof is prepared. An area for managing an initial value and a final value of this record ID, or the time stamp in unit of a file for subdividing/managing a data file is prepared. In such a case that only data for a certain time period is desirably processed among records of a data file, a range of this record ID, or this time stamp is designated, and then the data is compared with the initial value/final value of either the record ID or the time stamp of each file in order to judge as to whether or not the record to be processed is contained in this file. If the record to be processed is contained in this file, then the records contained in this file are processed. If the record to be processed is not contained in this file , then this file is not processed. For example, with respect to the data file for containing the records for the past 3 years, when only the records stored last October are to be processed, only such a file containing the records stored last October is to be processed by comparing the time stamps.

As previously explained, since the selecting process operation based upon the condition for the entering time period of the record can be done in units of a file, the processing efficiency of the record selecting process operation can be increased.

As previously explained, since the present invention is arranged with the above-described arrangement, the following effects can be achieved.

Since the file managing method is arranged so that a preselected number of records are subdivided from the original file for storing thereinto a plurality of records constituted by a plurality of fields so as to set the subdivided fields as blocks, and all of these subdivided blocks are coupled to each other so as to rearrange these subdivided blocks as the group, only the portion containing the field required in the process operation can be read out from the disk apparatus. As a consequence, the high speed processing operation can be realized.

Also, since the file managing method is arranged by that after all of the records are changed into fields having fixed lengths, the fixed-length-fields are subdivided from the original file so as to set the subdivided fields as blocks, the fields can be easily handled. As a consequence, the highspeed processing operation can be realized.

Furthermore, since the file managing method is arranged by that either one or plural fields of the record, which are located adjacent to each other, are combined with each other to be changed into a field having a fixed length, the adjoining fields can be continuously read out. As a consequence, the highspeed processing operation can be realized.

Also, since the file managing method is arranged by that the fields are sequentially formed by the fixed value from the head position of the record to thereby form the entire area of the records as the field having the fixed length, even when the field definition is changed, the data file is no longer required to be resubdivided.

Furthermore, since the file managing method is arranged by that the order of records within the block is changed every block, the eccentric access operation can be avoided.

Also, since the file managing method is arranged by that the record starting position within the block is changed every block, the eccentric access operation can be avoided.

Also, the file managing method is arranged by that the coupling sequence of the blocks within the group is changed every group. As a result, the eccentric access operation can be avoided.

Also, since the file managing method is arranged by that the blocks which have high possibilities when the blocks are simultaneously accessed within the block are arranged adjacent to each other, the adjoining fields can be continuously read out. As a consequence, the highspeed processing operation can be realized.

Also, since the file managing method is arranged by that the groups are stored into a plurality of disk apparatuses every a preselected number of the groups, and the respective disk apparatuses are accessed in a parallel manner as to the access operation to the original file, the amount of the data read from the disk apparatuses can be reduced. As a consequence, the highspeed processing operation can be realized.

Also, since the file managing method is arranged by that either the maximum value or the minimum value of the field values of the records is acquired every group, the access operation to the unnecessary page can be omitted. As a consequence, the highspeed processing operation can be realized.

Also, since the file managing method is arranged by that the identifier indicative of either the entering order of the records or the entering timing of the records is added to the page, the access operation to the unnecessary page can be omitted. As a consequence, the highspeed processing operation can be realized.

What is claimed is:

1. A file managing method comprising:
   subdividing an original file including a plurality of records, each record including a plurality of fields, for storing a plurality of blocks, each block including a plurality of fields subdivided from a plurality of the records;
   coupling the blocks into groups of blocks;
   rearranging the groups of blocks, and, after rearranging the groups of blocks, coupling the groups of blocks to each other to produce a transposed file; and
   accessing the fields from the transposed file, at random.

2. The file managing method as claimed in claim 1 including, before subdividing the original file, changing each of the fields of a record into one or more fields having fixed lengths for each field and, thereafter, subdividing the original file.

3. The file managing method as claimed in claim 2 including combining one or more fields of a record located adjacent to each other, with each other, into a field having the fixed length.

4. The file managing method as claimed in claim 1 including, before subdividing the original file, sequentially arranging the fields of a record at fixed positions from a head position of the record to form an area of the records having a field of a fixed length.

5. The file managing method as claimed in claim 1 including changing the order of records within a block in every block.

6. The file managing method as claimed in claim 5 including changing a record starting position within every block, wherein the records within each block are arranged in a wrap around manner.

7. The file managing method as claimed in claim 1 including changing, for every group of blocks, coupling sequence of the blocks within a group of blocks.

8. The file managing method as claimed in claim 7 including arranging adjacent to each other blocks which have respective fields with high possibilities of simultaneous access when the blocks are accessed within the groups of blocks.

9. A file managing method comprising:
   subdividing an original file including a plurality of records, each record including a plurality of fields, for storing a plurality of blocks, each block including a plurality of fields subdivided from a plurality of the records;
   coupling the blocks into groups of blocks;
   storing the groups of blocks in a plurality of disk apparatus for respective numbers of the groups of blocks; and
   accessing the respective disk apparatus in parallel to access the original file.

10. The file managing method as claimed in claim 9 including acquiring units of records with either a maximum value or a minimum value of the fields of the records in each unit.

11. The file managing method as claimed in claim 9 wherein an identifier indicative of one of an entering order of the records and the entering timing of the records is added to each unit of records and acquiring with each unit of records one of a maximum value of the identifier and a minimum value of the identifier for retrieval of a record.

12. A file managing method comprising:

from an original file including a plurality of records, each record including a plurality of fields, grouping respective fields for a number of records as blocks;

coupling the blocks for each of the fields into groups of blocks;

coupling a plurality of the groups of blocks to each other to produce a transposed file including all of the records of the original file; and utilizing the transposed file to output a selective one of the fields.

13. The file managing method according to claim 12, wherein each of the groups of blocks includes an identical number of records.

14. The file managing method according to claim 12, wherein each of the groups of blocks includes a corresponding field for each of the records.

15. A file managing method comprising:

from an original file including a plurality of records, each record including a plurality of fields, grouping respective fields for a number of records as blocks;

coupling the blocks for each of the fields into groups of blocks;

storing the groups of blocks in respective memory disk apparatus; and accessing the respective disk apparatus in parallel to output a selected field.

* * * * *